United States Patent

[11] 3,542,428

| [72] | Inventor | Ivo Colucci<br>Milan, Italy |
|---|---|---|
| [21] | Appl. No. | 746,910 |
| [22] | Filed | July 23, 1968 |
| [45] | Patented | Nov. 24, 1970 |
| [73] | Assignee | Alfa Romeo S.P.A.<br>Milan, Italy<br>a company of Italy |
| [32] | Priority | Aug. 2, 1967 |
| [33] | | Italy |
| [31] | | No. 19141 A/67 |

[54] SEAT IN PARTICULAR FOR MOTOR VEHICLES, WITH ADJUSTABLE HEAD REST OF TOTALLY VANISHING TYPE
2 Claims, 4 Drawing Figs.

[52] U.S. Cl. .................................................. 297/410
[51] Int. Cl. .................................................. A47c 7/38
[50] Field of Search .......................................... 297/410

[56]  References Cited
UNITED STATES PATENTS

| 2,618,041 | 11/1952 | Nelson ........................ | 297/410X |
| 2,985,229 | 5/1961 | Shamblin ..................... | 297/410 |
| 3,027,194 | 3/1962 | Rumptz ........................ | 297/410 |
| 3,311,413 | 3/1967 | Martens ....................... | 297/410 |
| 3,369,786 | 2/1968 | Schloemer .................... | 297/410X |

Primary Examiner—Nile C. Byers, Jr.
Attorney—Holman, Glascock, Downing & Seebold ABSTRACT: A seat having an adjustable head rest which, in its inoperative position, forms part of the back of the seat and, in its operative position, is raised and adjusted in height.

Patented Nov. 24, 1970
3,542,428
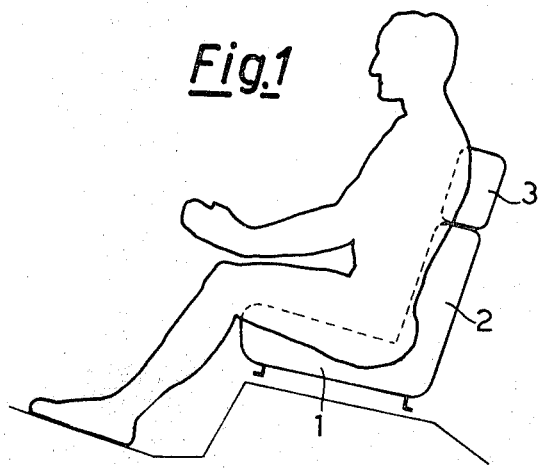
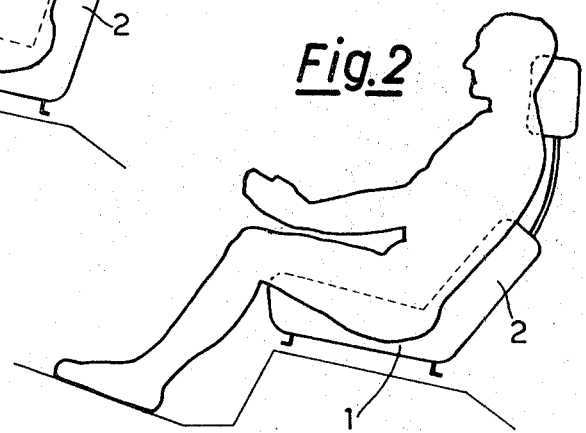
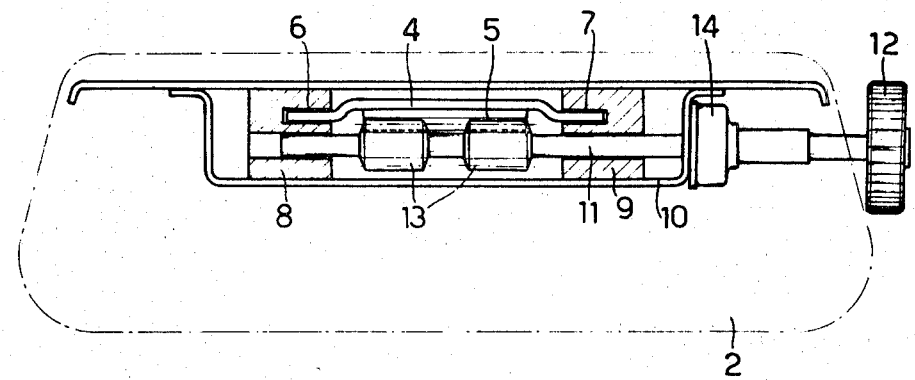
INVENTOR
I. COLUCCI
BY Glascock, Downing & Sutold
ATTORNEY

3,542,428

SEAT IN PARTICULAR FOR MOTOR VEHICLES, WITH ADJUSTABLE HEAD REST OF TOTALLY VANISHING TYPE

BACKGROUND OF THE INVENTION

This invention refers to a seat, and in particular to a seat for motor vehicles provided with a headrest attached to the back of the seat per se.

Seats of this type are well known, but in such prior seats the headrest is either rigidly fixed to the seat structure, or is completely removable, and in any case constitutes a quite distinct part of the back.

The seat which forms the object of the present invention, however, is characterized by the fact that the headrest forms a part of the back of the seat, and can be raised and adjusted in height so that it forms an element of rest for the head of the user.

SUMMARY OF THE INVENTION

According to the invention, the headrest in its lowest position assumes the role of a seat back and is contained within the usual shape of the back, so as to conceal the presence of the headrest which is often a nonaesthetic element.

A further characteristic is that the mechanism for the raising and adjusting of the headrest is contained within the overall space of the back, and allows at the same time both the raising movement and a forward movement, so as to follow the anatomical configuration of the user thus giving rise to an element which is physiologically acceptable.

These and further characteristics will appear more clearly from the following description which refers to a preferred embodiment illustrated in the attached drawings in which:

BRIEF DESCRIPTION OF THE DRAWINGS

FIG. 1 shows schematically the seat back with the headrest in the lowest position (totally vanished) and the shape assumed by the user in such a position;

FIG. 2 shows schematically the seat with the headrest in the raised position;

FIG. 4 is a view in horizontal section of the back.

DETAILED DESCRIPTION OF THE INVENTION

Figure 3:
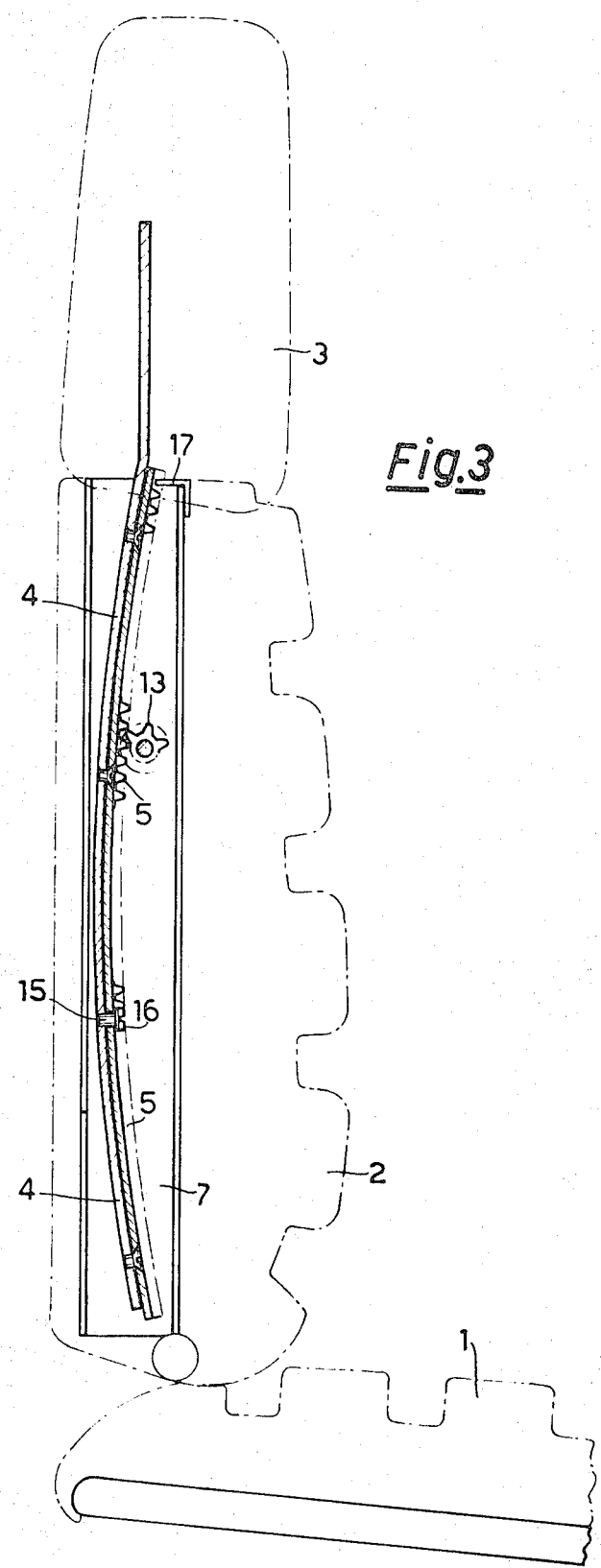
FIG. 3 is a view in vertical section through the middle of the back of the seat.

The seat illustrated 1 is provided with a back of normal height which consists of two parts, namely a lower part 2 and an upper part 3, with the upper part being joined to the lower part so as to be able to be raised and adjusted in height in order to constitute in this position an element of rest for the head of the user (FIG. 2).

In the embodiment illustrated, the device for the raising and adjusting of the part 3 consists of a movable metallic supporting plate 4 to one extremity of which is fixed the headrest 3 and on the lower surface of which is fixed a toothed rack 5. The edges of the plate 4 run in parallel guides 6 and 7 formed from blocks of wood 8 and 9 positioned in a suitable metallic box 10 fixed to the inside of the lower part 2 of the back. A shaft 11 is located and supported in the box 10 and can be rotated on its own axis by means of an external knob 12. The shaft 11 is provided with one or two toothed pinions 13 which mesh with the toothed rack 5 and transmit movement to the movable plate 4 to which the toothed rack is fixed.

A positioning clutch 14 maintains the movable plate in the desired position when the knob 12 is released.

In order to effect a forward movement of the headrest 3 at the same time as the raising movement, the supporting plate 4 and guides have a longitudinal profile which is curved (FIG. 3) with the center of the curvature being towards the front. Finally, the movable plate is provided with a screw 15 having a projecting head 16 which functions to limit the raising motion and prevent the plate from slipping out of the guides by striking a stop 17.

I claim:

1. A seat structure and more particularly a seat structure for motor vehicles, including a back having a lower part and an upper part, said upper part having a first position adjacent the lower part and a second position raised from the lower part in which the upper part serves as a headrest, and means within the lower part operably connected to the upper part for raising and allowing slight forward rotation of the upper part, said means comprising a plate of concavo-convex configuration located within the lower part, a boxlike member secured within the lower part, a guide member within the boxlike member extending parallel to each longitudinal edge of the plate having a guide for receiving each edge of the plate, a toothed rack on the concavo surface of the plate, a shaft extending transversely respecting the plate and mounted for rotation within the boxlike member, at least one pinion on said shaft in mesh with the toothed rack, and a manipulating knob on the shaft exteriorly of the lower part for rotating such shaft whereby rotation in one direction moves the upper part to its second position via said pinion and rack and rotation in the other direction moves the upper part to the first position.

2. The seat structure as claimed in claim 1 in which said shaft is provided with a clutch between the boxlike member and the manipulating knob for maintaining the plate in its adjusted position when the knob is released and a projection extending from the concavo surface of the plate which coacts with a stop adjacent the upper end of the lower part to limit the raising movement of the plate.